Dec. 19 1922.
F. G. CLUMP ET AL.
VALVE MECHANISM.
FILED APR. 26, 1920.
1,439,503
2 SHEETS-SHEET 1.
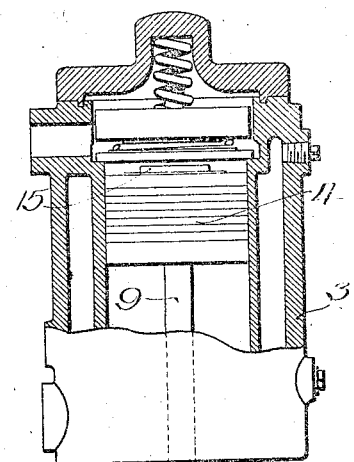
Fig.1
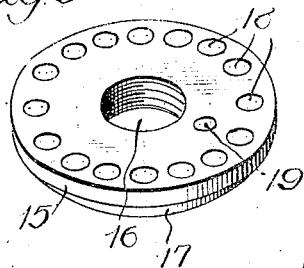
Fig.5
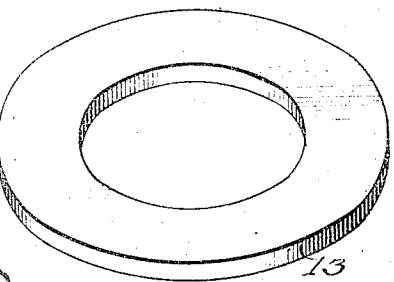
Fig.4
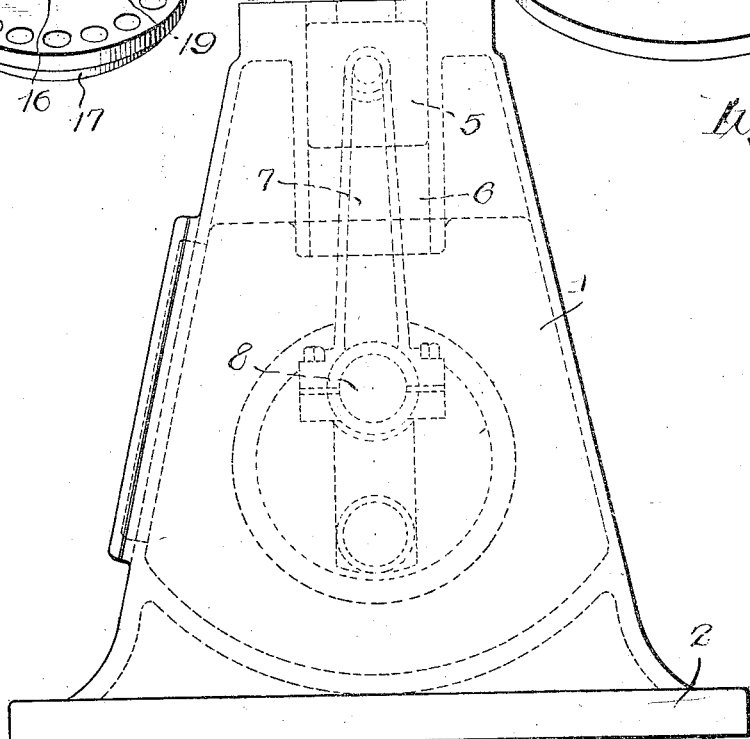
Inventors
E. A. Burrows
F. G. Clump
By Arthur F. Durand
Atty Dec. 19 1922. 1,439,503
F. G. CLUMP ET AL.
VALVE MECHANISM.
FILED APR. 26, 1920.
2 SHEETS-SHEET 2
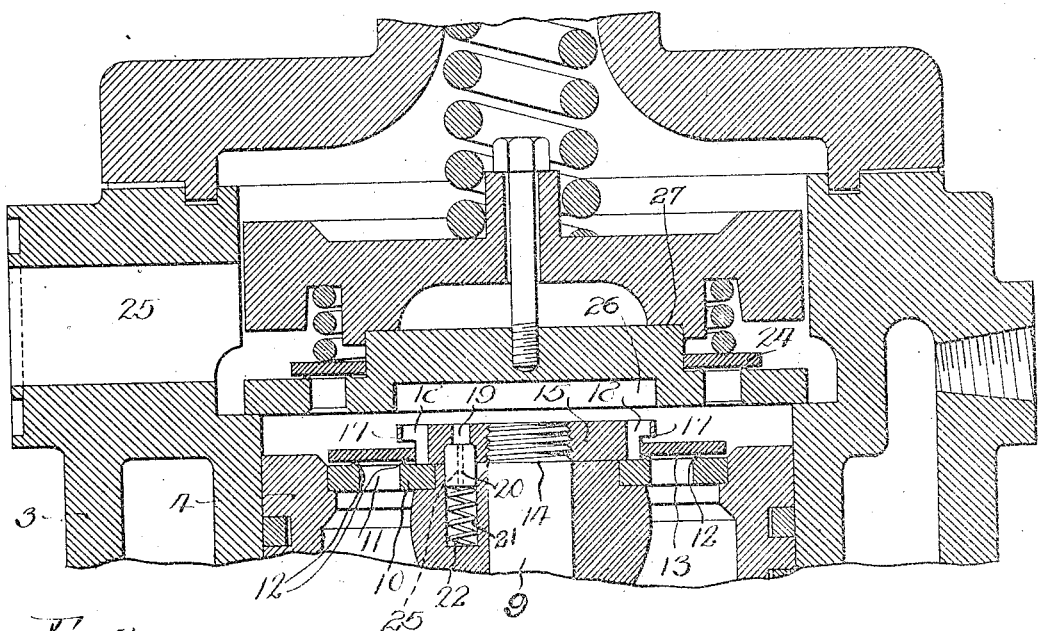
Fig.2
Fig.6
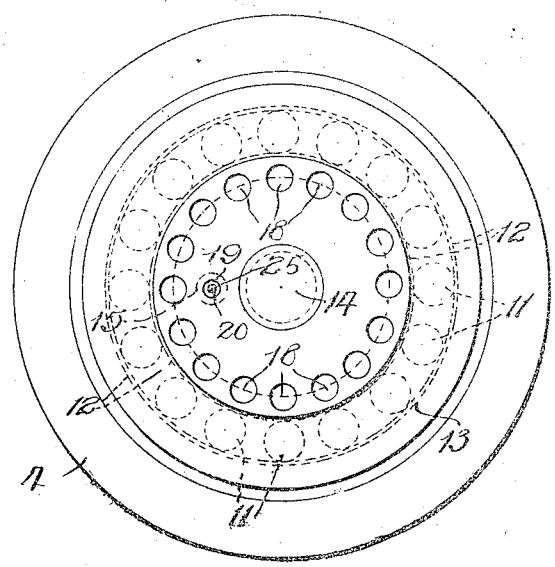
Fig.3
Inventors
E. A. Burrows
F. G. Clump Patented Dec. 19, 1922.

1,439,503

UNITED STATES PATENT OFFICE.

FREDERICK G. CLUMP AND EASTMAN A. BURROWS, OF CHICAGO, ILLINOIS, ASSIGNORS TO CONTINENTAL MACHINERY COMPANY, OF CHICAGO, ILLINOIS, A CORPORATION OF DELAWARE.

VALVE MECHANISM.

Application filed April 26, 1920. Serial No. 376,513.

*To all whom it may concern:*

Be it known that we, FREDERICK G. CLUMP and EASTMAN A. BURROWS, citizens of the United States of America, and residents of Chicago, Illinois, have invented a certain new and useful Improvement in Valve Mechanism, of which the following is a specification.

This invention relates to compressors for use in refrigerating plants or systems, and more particularly to the valves which are employed in the piston heads of said compressors. Heretofore, these valves have been retained in place in various ways, but always with more or less difficulty, owing to the high speed of the compressor, and the consequent pounding of the movable valve member against the said retaining means, as well as against its seat, the expansion and contraction of the metal and the violent impacts tending to loosen the retaining means. Various expedients have been proposed and used for the purpose of counteracting this tendency, and with a view to minimizing this sort of trouble as much as possible, but notwithstanding these efforts the results were not entirely satisfactory.

The object of the invention is, therefore, to provide in connection with a piston head valve of this general character a simple and comparatively inexpensive retaining means whereby it is not only possible to retain the movable valve member in place without danger of the retaining means becoming loose as the result of the continual and incessant pounding of the valve against its seat at one side and the retaining means at the other side, the said seat forming one anvil and the retaining means forming the other anvil, upon which the impacts of the valve are delivered, and because of the expansion and contraction of the said retaining means, owing to sudden changes in temperature, but whereby it is also possible to readily remove the valve when such is necessary or desirable.

It is also an object to provide certain details and features of construction and combinations tending to increase the general efficiency and the desirability of a valve construction of this particular character.

To these and other useful ends the invention consists in matters hereinafter set forth and claimed, and shown in the accompanying drawings, in which—

Fig. 1 is a side elevation of a refrigerating system compressor having a piston head valve construction embodying the principles of the invention, a portion of said compressor being shown in vertical section.

Fig. 2 is an enlarged vertical section of the upper portion of said compressor, showing the mechanism in detail.

Fig. 3 is a top plan view of the piston head, showing the said valve mechanism thereof.

Fig. 4 is a perspective of the flat ring which forms the movable valve member at the top of the piston head.

Fig. 5 is a perspective of the screw threaded retainer which is screwed upon the upper end of the piston rod to limit the upward movement of the said valve member relatively to the valve seat thereof, and to thus retain the valve member in position on the top of the piston head.

Fig. 6 is an enlarged sectional view showing the movable valve member or flat ring composed of a plurality of thin layers of sheet metal, loosely assembled, the laminated construction thus employed having certain advantages, as will hereinafter more fully appear, and the lamina being of any suitable or desired number, and of any suitable thickness.

As thus illustrated, the compressor is of any suitable, known or approved form, and has a lower body or casing 1 which is supported by a base 2 that rests on the floor. The cylinder 3 of the compressor is supported on the casing 1 in any suitable or desired manner, and contains the vertically reciprocating piston 4, said piston reciprocating up and down at high speed to compress the refrigerating fluid in the well known manner. As usual in a compressor of this type the cross-head 5. which slides up and down in the cylindric chamber 6, is connected by a pitman 7 with the crank 8 by which the compressor is operated. The piston rod 9 is rigidly connected to the piston head 4, and to the top of the cross-head 5, so that the two are rigidly connected together and slide up and down or reciprocate in unison.

The piston head 4 is of a well known type, and has a ring 10 provided with ports 11, each port being round, and the ring having two raised edges 12 extending around the upper surface thereof, with said ports disposed between them, so that these edges serve as the valve seat. A flat valve ring 13 is normally seated on the raised edges or valve seat thus formed by said annular concentric edges 12, thus normally closing said ports. When said ring 13 rises, the ports 11 are opened, thus allowing the fluid to be compressed to pass upward through the ports 11, in the well known manner. The piston rod 9 has its upper end portion 14 screw threaded to receive the retainer 15, which latter is in the form of a flat ring which is removable merely by access thereto, having a central threaded opening 16 for the screw threaded end of the piston rod. This ring 15 extends over the ring 10, as shown, to retain the valve seat in position, and has an offset 18 on the under side thereof, forming a shoulder to limit the upward movement of the valve ring 13, so that the latter vibrates between this shoulder (one anvil) above and the valve seats 12 (the other anvil) below on the top of the ring 10 previously described. Openings 18 are provided in the retainer 15, near the outer edge thereof, so that the fluid can pass upwardly from the inner edge of said valve ring 13, as well as from the outer edge thereof, the inner edge of said ring 13 engaging the sides of the portion of said retainer 15 below said offset 17, the openings 18 being partly in said offset and partly in the thick central portion of said retainer, so that the lower portion of said retainer is in effect grooved vertically by the formation of said openings therein. An opening 19 is formed in said retainer 15, for the short pin 20, which latter extends downward into the opening 21 in the piston head, a coil spring 22 in said last mentioned opening serving to yieldingly hold said pin in normal position to lock the retainer 15 against unscrewing from the piston rod. When it is desired to remove said retainer, the pin 20 is pushed downward by the insertion of an instrument in the opening 19, so that the retainer may then be unscrewed, thereby permitting the removal of the valve ring 13 from the piston head.

The rings 10, 13 and 15 are of any suitable metal, such as steel, and are, of course, of such degree of hardness that they will stand the continual hammering of the valve while the compressor is in operation, (the machine runs at high speed) so that the valve ring 13 vibrates very rapidly between the upper and lower anvils (the offset 17 and the valve seats 12) and it is this action that has, with other constructions, caused trouble, the parts becoming loose and worn; but with the retainer 15 screwed directly upon the upper end of the piston rod, and made heavier than heretofore, the hammering of the valve is not as liable to loosen the retainer, and the latter is held against rotation by the pin 20 previously described. With this construction, the screw threads on the piston rod and the retainer 15 can be of a character to ensure better results, and less liability of the retainer gradually becoming loosened by the rapid hammering of the valve ring. The rings 10, 13 and 15 are removable merely by access to the top of the piston head, and by simply unscrewing the retainer ring 15, as access below the piston head is not necessary for this purpose.

If desired, the valve ring 13 may be of a laminated character, as shown in Fig. 6, the several thin layers 23 of sheet metal being loosely assembled, so that a thin air cushion is formed between each ring and the one above. Thus when the valve constructed in this way rises, the impact against the offset or shoulder 17 is reduced somewhat by the cushioning effect of the thin layers of air between the thicknesses 23 of sheet metal, and the same action takes place when the valve ring moves downward, the impact in both cases being materially reduced by the cushioning action of the air between the lamina or thicknesses of sheet metal. This expedient, therefore, serves to reduce the wear and tear on the valve mechanism, and to extend the life thereof, inasmuch as the impacts of the valve ring against the upper and lower anvils which limit its motion are reduced in violence somewhat, by this laminated construction of the valve, as compared with the heavier impacts delivered by a solid or one-piece valve ring.

Thus, as previously explained, the valve retainer 15 which holds the ring 10 in place and limits the upward movement of the valve 13 from its seat, and which has the offset 17 which sustains the impacts of the valve, is advantageously screwed directly upon the threaded upper end portion of the piston rod, instead of upon the piston head itself. The valve retainer ring 15 is not only thicker and heavier than was heretofore possible in certain constructions employed for this purpose, but is also held in place by the retainer pin 20 which is inserted vertically in the piston head, and in the retainer ring itself, so that this pin merely resists any tendency on the part of the retainer ring to become loosened by backward rotation thereof on the threaded upper end of the piston rod.

In accordance with the construction shown and described, it will be understood that the fluid pressure passes upwardly through the piston head and through the ports 11, causing the valve 13 to rise when the piston head moves downward. When the motion is reversed, and the piston head moves upward, then the refrigerating fluid is compressed in the cylinder in the space above the piston head, sufficiently to cause the upper valve 24 to rise, so that the fluid is forced into the outlet passage 25 in the usual and well known manner.

The pin or element 20 preferably has a longitudinal passage 25 to equalize the pressure above and below this element, so that it will not be displaced downward when the piston or plunger moves upward. Furthermore, the raised edges 12 which form the valve seat provide in effect additional area or surface on the bottom of the valve ring 13 for the pressure to act upon to open the valve. In other words, the total area upon which the pressure below the plunger can act or exert itself, by passing upward through the holes 11, is not merely equal to the total area of these holes, but is this area plus the total area or surface included between the holes 11, and between the raised edges 12, so that the entire lower surface of the ring 13 included between said edges is subject to pressure from below to lift and open the valve at the proper time. It will also be seen that the holes 18 serve the further purpose of allowing the fluid pressure to escape downward from the cavity 26 in the so-called false head 27, when the plunger head reaches the end of its upward stroke. Another advantage of this construction is that the retainer nut or ring 15 is not subject to the loosening action on the threads 14, when expanded by high temperature. Ordinarily, with some constructions heretofore employed, the expansion and contraction tends to wear the screw threads and thereby in conjunction with the continual pounding of the valve, loosens the valve retaining means, and causes trouble. This would be true, for ample, with the diameter of the hole 16 much larger, and with the ring 15 screwed upon a threaded portion of the plunger head 4, the ring 15 being of steel and the head 4 being made of cast iron, but with the hole 16 of small diameter, thus minimizing the variation in the diameter of the hole by the expansion and contraction of the metal, and with the steel ring 15 screwed directly upon the steel plunger rod 9, the expansion and contraction does not wear the screw threads so rapidly, and the nut or retainer 15 will remain tight on the rod and free from looseness for a much longer time. Of course, the valve ring or movable valve member 13 is opened or raised from the seat not only by the pressure below, but also by inertia—that is to say, the quick down stroke of the plunger head tends to leave the valve ring 15 behind, so to speak, and to show the ring violently against the shoulder 17 of the retainer ring; and thus inertia and the fluid pressure combine to lift the valve from its seat as the plunger starts downward; but, as explained, this violent pounding of the valve against the shoulder 17, and the sudden changes in temperature, do not result in loosening the retainer 15 on the threaded end of the rod 9, or at least this tendency is greatly reduced. When the valve ring is formed by a plurality of thicknesses, as shown in Fig. 6, the valve is exactly as strong as the solid ring 13 shown in Fig. 4, as the combined stiffness or strength of the different thicknesses is the same, or may be the same, as the stiffness and strength of the solid ring; but the air cushions between the layers or thicknesses serve to reduce the impact on the shoulder 17, and thus contribute to the desired result of preventing or tending to prevent the retainer nut or ring 15 from becoming loose on the plunger head rod.

The opening 19, it will be seen, is restricted at its upper end to limit the upward movement of the pin 20, so that the latter is normally slightly below the top of the ring which forms the valve retainer. There are various ways, however, of locking the valve retainer ring against unscrewing from the upper end of the piston rod.

What we claim as our invention is:—

1. In valve mechanism for controlling fluid under pressure, the combination of a member having means forming thereon, a valve ring normally resting upon said seat, an axial center post extending through and held in said member, and a retainer ring screwed upon said post and held thereon entirely by the screw thread connection therewith and provided with means to limit the upward movement of said valve ring, so that the impacts of said valve ring on said retainer ring are communicated directly to the screw thread formation on said post, instead of to said member, and adapted to resist displacement of the member from said post.

2. A structure as specified in claim 1, said member being a vertically reciprocating piston and said post being the upper portion of the piston rod, in combination with a device to lock the said retainer ring merely against rotation on the threaded portion of the piston rod.

3. A structure as specified in claim 1, said retainer ring having openings therein to permit the escape of the fluid pressure from under the inner edge of said valve ring, having its under side provided with an offset in which said openings are partially formed to overhang the inner edge portion of said valve ring.

4. A structure as specified in claim 1, said valve seat being held in place by said retainer ring, being formed with an annular series of openings therein, so that by removing the retainer ring, the valve seat can be removed from said member, and having its upper surface provided with concentric raised edges to engage the under side of the valve ring, with said openings disposed between the two annular edges, so that said openings form ports which are closed when the valve ring rests by gravity upon these edges of the valve seat.

5. A structure as specified in claim 1, said retainer ring having its under side provided with an offset which overhangs the inner edge of the valve ring, the sides of the retainer ring below the offset engaging the inner edge of the valve ring, thereby to center the valve ring on said member, and said retainer ring having openings to afford opportunity for the escape of the fluid pressure from under the inner edge of the valve ring.

6. A structure as specified in claim 1, in combination with a pin inserted vertically in said retainer ring, and in said member, so that the retainer ring is locked against rotation on the screw threaded portion of said post, said retainer ring being removable while said pin is within said member.

7. A structure as specified in claim 1, said member having a vertical opening therein, said retainer ring being also provided with a vertical opening, one opening registering with the other when the retainer ring is screwed into position, a locking pin in said openings, the opening in the retainer ring being formed to prevent upward removal therefrom of said pin, and a spring in the opening below the pin, whereby the latter can be pressed downward by insertion of an instrument in the upper opening, thereby to release and permit unscrewing of the retainer ring.

8. In a compressor, the combination of a piston rod, a piston head on said rod, said piston head having removable means thereon forming ports to provide passages through which the fluid pressure may pass from one side of the piston head to the other, a valve ring controlling said ports, a retainer ring which is removable merely by access directly thereto, adapted to hold said removable means in place and to limit the opening movement of said valve ring, and means to secure the retainer ring directly on the piston rod.

9. A structure as specified in claim 8, said means for securing the retainer ring on the piston rod consisting of screw threads on the rod, above the plane of said removable means, and a screw threaded opening in the center of the ring, whereby the impacts of said valve ring are communicated through said retainer ring to the screw threads on said rod.

10. A structure as specified in claim 8, said retainer ring having an offset to provide an anvil overhanging said removable means to receive the impacts of the valve ring, the inner edge of the valve ring engaging the sides of the retainer ring below said anvil.

11. A structure as specified in claim 8, said retainer ring having openings therein out of line with said ports to permit the escape of the fluid pressure from under the inner edge of the valve ring, and having an offset in which said openings are partially formed, providing means for limiting the opening movement of the valve ring.

12. A structure as specified in claim 1, said valve being of laminated construction, and the lamina thereof being loosely assembled and free to separate, so that thin air cushions are provided between the loose and unconnected thicknesses forming the lamina, thereby to insure a cushioning action to reduce the impacts of the valve ring against its seat and against said retainer ring.

13. A structure as specified in claim 8, said valve ring being composed of a plurality of thicknesses of sheet metal, loosely assembled and free to float up and down and separate, forming thin air cushions between them, the different thicknesses being free to separate and then come together again, so that the impacts of the valve ring against its seat and against the retainer ring are materially reduced in force.

14. In valve mechanism, the combination of a valve seat, a valve to engage the seat, means to limit the opening movement of the valve, operating means causing the valve to vibrate rapidly between its seat and the means for limiting its opening movement, so that in effect the valve vibrates between two anvils which receive the impacts thereof, said valve being composed of a plurality of thicknesses loosely assembled and free to float up and down and separate, providing thin air cushions between them, the different thicknesses being free to separate and then come together again, thereby to reduce the force or violence of the impacts of the valve upon said anvils.

15. A structure as specified in claim 1, said post and said retainer ring being both formed of steel with a flange on the steel retainer ring extending over and adapted to receive the impacts of the valve ring, and a valve seat ring held in place by said retainer ring, substantially as shown and described.

16. The structure covered by claim 7, said pin having a passage to equalize the pressure above and below the pin to prevent displacement of the pin by the pressure.

17. The structure covered by claim 2, said device having means to equalize the pressure at opposite sides thereof to prevent displacement thereof by the pressure.

18. The structure covered by claim 5, in combination with means forming a cavity to receive said retainer ring, said openings serving also to permit the escape of pressure from said cavity, said member being movable to carry said retainer ring into said cavity.

19. A structure as specified in claim 8, said retainer ring and piston rod being both formed of steel, and said removable means being in the form of a ring extending under the steel retainer ring.

20. A structure as specified in claim 1, the diameter of said post relatively to the diameter of said retainer ring being small to minimize loosening of the screw thread connection by expansion and contraction of the retainer ring on the post, and said retainer ring being screwed against said member, and thereby capable of holding said member against displacement from said post.

FREDERICK G. CLUMP.
EASTMAN A. BURROWS.